United States Patent

Curtis

(10) Patent No.: US 12,517,849 B2
(45) Date of Patent: Jan. 6, 2026

(54) SYSTEM AND METHODS FOR MATRIX MULTIPLICATION

(71) Applicant: Microchip Technology Incorporated, Chandler, AZ (US)

(72) Inventor: Keith Curtis, Queen Creek, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 11 days.

(21) Appl. No.: 18/098,296

(22) Filed: Jan. 18, 2023

(65) Prior Publication Data

US 2024/0037047 A1 Feb. 1, 2024

Related U.S. Application Data

(60) Provisional application No. 63/393,170, filed on Jul. 28, 2022.

(51) Int. Cl.
*G06F 13/28* (2006.01)
*G06F 7/50* (2006.01)
*G06F 7/523* (2006.01)

(52) U.S. Cl.
CPC ............... *G06F 13/28* (2013.01); *G06F 7/50* (2013.01); *G06F 7/523* (2013.01); *G06F 2213/28* (2013.01)

(58) Field of Classification Search
None
See application file for complete search history.

(56) References Cited

U.S. PATENT DOCUMENTS

| | | | |
|---|---|---|---|
| 6,298,366 B1 | 10/2001 | Gatherer et al. | 708/523 |
| 6,504,785 B1 * | 1/2003 | Rao | G06F 9/383 |
| | | | 712/E9.047 |
| 9,588,503 B2 * | 3/2017 | Cooper | G06F 3/067 |
| 10,133,691 B2 * | 11/2018 | Brewer | G06F 13/28 |
| 10,282,328 B2 * | 5/2019 | Lee | G06F 13/1673 |
| 10,459,854 B2 * | 10/2019 | Park | G06F 13/28 |
| 10,877,911 B1 * | 12/2020 | Khan | G06F 13/28 |
| 10,983,920 B2 * | 4/2021 | Thyamagondlu | G06F 13/28 |
| 11,386,029 B2 * | 7/2022 | Winblad | G06F 13/28 |
| 11,409,685 B1 * | 8/2022 | Kaplan | H04L 67/1095 |
| 11,822,812 B2 * | 11/2023 | Fan-Chiang | G06F 3/0673 |
| 11,847,507 B1 * | 12/2023 | Borkovic | G06F 9/52 |

(Continued)

OTHER PUBLICATIONS

International Search Report and Written Opinion, Application No. PCT/US2023/011816, 12 pages.

*Primary Examiner* — Henry Tsai
*Assistant Examiner* — Christopher A Bartels
(74) *Attorney, Agent, or Firm* — SLAYDEN GRUBERT BEARD PLLC

(57) ABSTRACT

A peripheral device for matrix multiplication including a weight memory, an input memory, a multiplier, an accumulator, an output memory and a sequencer to generate signals to drive the input memory and the output memory and to generate an interrupt signal. The weight memory may be loaded with weights and biases for a matrix multiplication operation, and the multiplier and accumulator may implement the multiply and accumulator operations for a matrix multiplication operation. Data may be swapped between the input memory and output memory to reduce the memory required for matrix multiplication operations.

17 Claims, 4 Drawing Sheets

(56) References Cited

U.S. PATENT DOCUMENTS

| | | | |
|---|---|---|---|
| 12,381,751 B2* | 8/2025 | Sen | G06F 13/1694 |
| 2013/0318277 A1* | 11/2013 | Dalal | H04L 47/10 |
| | | | 710/308 |
| 2014/0101763 A1* | 4/2014 | Harlacher | H04L 63/1458 |
| | | | 711/163 |
| 2014/0201416 A1* | 7/2014 | Dalal | G06F 9/3877 |
| | | | 710/308 |
| 2017/0195259 A1* | 7/2017 | Florea | H04L 47/726 |
| 2018/0121796 A1* | 5/2018 | Deisher | G06N 3/045 |
| 2018/0225116 A1* | 8/2018 | Henry | G06N 3/044 |
| 2018/0246790 A1* | 8/2018 | Sankaranarayanan | |
| | | | G06F 11/2017 |
| 2018/0276534 A1* | 9/2018 | Henry | G06F 9/3895 |
| 2019/0286974 A1* | 9/2019 | Li | G06N 3/045 |
| 2021/0019403 A1* | 1/2021 | Mehta | G06N 3/08 |
| 2021/0373951 A1* | 12/2021 | Malladi | G06F 9/5016 |
| 2021/0406437 A1* | 12/2021 | Wu | G06F 15/7889 |
| 2022/0014592 A1* | 1/2022 | Kachare | H04L 67/51 |
| 2022/0222337 A1* | 7/2022 | Doshi | G06F 21/53 |
| 2022/0261032 A1* | 8/2022 | Bateni | G06F 1/12 |
| 2024/0020253 A1* | 1/2024 | Sharma | G06F 13/28 |
| 2024/0143531 A1* | 5/2024 | Inoue | G06F 13/28 |
| 2024/0281393 A1* | 8/2024 | Lai | G06F 13/28 |
| 2024/0320174 A1* | 9/2024 | Pedersen | G06F 13/28 |
| 2024/0420488 A1* | 12/2024 | Shen | B62J 50/225 |
| 2025/0140098 A1* | 5/2025 | McFarland | G08B 21/22 |
| 2025/0165148 A1* | 5/2025 | Shukla | G06F 3/0611 |

\* cited by examiner ature SYSTEM AND METHODS FOR MATRIX MULTIPLICATION

This application claims priority to commonly owned U.S. Patent Application No. 63/393,170 filed Jul. 28, 2022, the entire contents of which are hereby incorporated by reference for all purposes.

TECHNICAL FIELD

The present disclosure relates to peripheral devices in a microcontroller or system on a chip, and in particular to matrix multiplication.

BACKGROUND

Complex algorithms and processing blocks are found in more and more applications. Simple algorithms may utilize embedded controls that are programmed for specific responses to specific input conditions. More advanced algorithms may utilize predictive responses to non-specific input conditions. Implementing these predictive algorithms in software can be slow and repetitive.

Many of these advanced algorithms and processing blocks are implemented as a matrix multiplication operation. In one example, an input pattern may be input to an artificial intelligence (AI) pattern recognition algorithm that is executed as a sequence of matrix multiplication operations. In another example, an input stream of audio samples may be filtered by a finite impulse response (FIR) or an infinite impulse response (IIR) filter which may be implemented as matrix multiplication operation.

In an embedded system, a microcontroller may be used to control program flow, respond to interrupts, process and move data, and perform other operations to keep the overall system functioning well. A matrix multiplication function running on a microcontroller may place a heavy processing burden on the microcontroller and in the extreme, may cause a number of system errors. In one case, the matrix multiplication operation may fail if it is required to generate real-time output and the microcontroller is busy servicing other higher priority functions of the system.

There is a need in embedded systems for a device which can execute complex matrix multiplication operations with a small memory footprint while simultaneously leave the microcontroller free to manage overall system performance.

BRIEF DESCRIPTION OF THE FIGURES

The figures illustrate examples of systems for matrix multiplication.

SUMMARY

Figure 1:
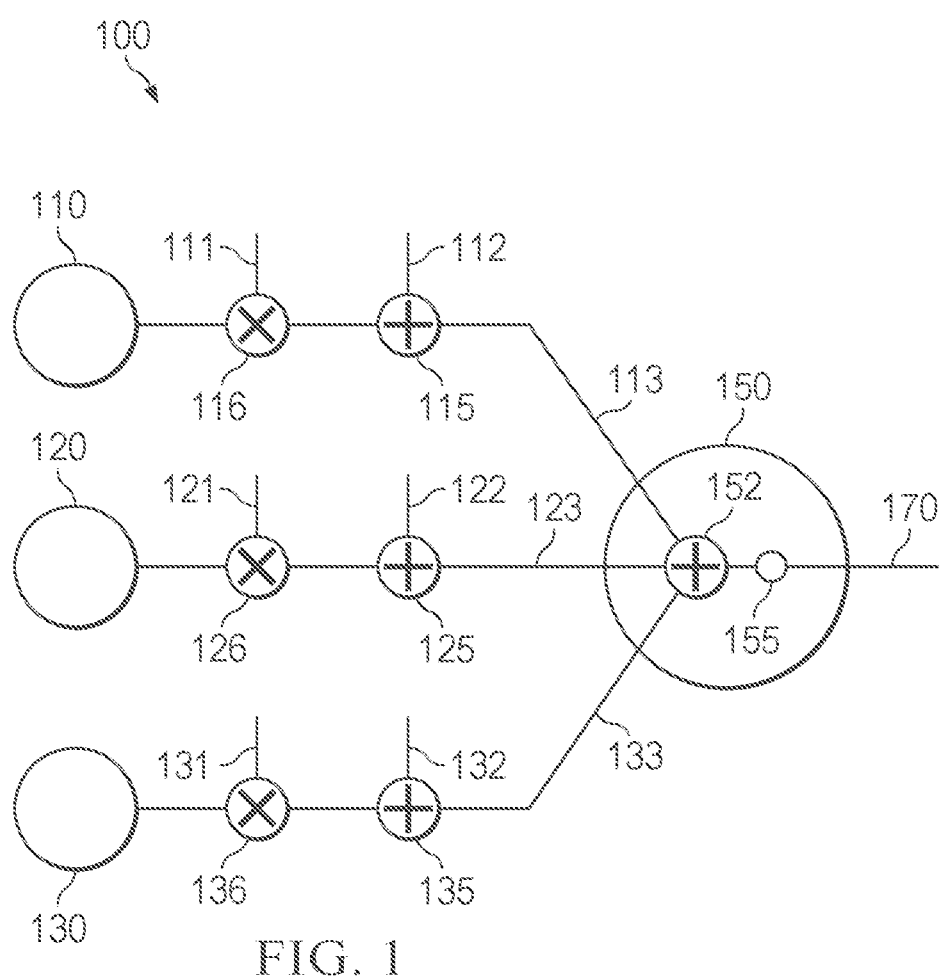
FIG. 1 illustrates a three-input perceptron.

A peripheral including a weight memory to receive data input from, respectively, an external DMA circuit and a system bus and to receive control input from the sequencer, the weight memory to provide a weight memory output, an input memory to receive data input from the system bus and control input from the sequencer, the input memory to provide an input memory output, a multiplier to receive input from, respectively, the weight memory output and the input memory output, the multiplier to generate a multiplier output, an accumulator to receive input from, respectively, the multiplier output and an output memory output, the accumulator to generate an accumulator output, an output memory to receive data input from the weight memory output, the accumulator output, and the system bus, and to receive control input from the sequencer, the output memory to provide output to, respectively, the system bus and an output memory output, and wherein the sequencer generates output signals coupled to the input memory and the output memory, and generates an interrupt signal based on a programmable condition;

A microcontroller including a peripheral, the peripheral comprising a weight memory to receive data input from, respectively, a DMA circuit and a system bus and to receive control input from the sequencer, the weight memory to provide a weight memory output, an input memory to receive data input from the system bus and control input from the sequencer, the input memory to provide an input memory output, a multiplier to receive input from, respectively, the weight memory output and the input memory output, the multiplier to generate a multiplier output, an accumulator to receive input from, respectively, the multiplier output and an output memory output, the accumulator to generate an accumulator output, an output memory to receive data input from the weight memory output, the accumulator output, and the system bus, and to receive control input from the sequencer, the output memory to provide output to, respectively, the system bus and an output memory output, wherein the sequencer generates output signals coupled to the input memory and the output memory, and generates an interrupt signal based on a programmable condition, and an activation circuit to compute an activation function at a predetermined time, based at least in part on a value stored in the output memory.

A method including loading weight values into a weight memory, loading input values into an input memory, multiplying, respectively, a value stored in the weight memory and a value stored in the input memory to generate a multiplier output, accumulating a plurality of successive multiplier outputs in an accumulator, storing the result of the accumulator in an output memory, triggering an interrupt signal in response to storing the result, and transferring a plurality of results of the accumulator from the output memory to the input memory after a predetermined number of accumulator results have been stored in the output memory.

DESCRIPTION

One of various examples of a matrix multiplication operation may be the computations within a neural network. FIG. 1 shows one of various examples of a single node of a neural network, commonly referred to as a perceptron 100. First input 110, second input 120 and third input 130 may be storage locations which contain numerical values. Numerical values may be provided to first input 110, second input 120 and third input 130, by a sensor, processor, microcontroller, memory or other source capable to provide numerical values. Numerical values provided to first input 110, second input 120 and third input 130 may be provided, respectively, by the same source or may be provided from different sources. First weight 111, second weight 121 and third weight 131 may be storage locations which may contain numerical values. Numerical values may be provided to first weight 111, second weight 121 and third weight 131 by a sensor, processor, controller, memory or other source capable to provide numerical values. Numerical values provided to first weight 111, second weight 121 and third weight 131 may be provided, respectively, by the same source or may be provided from different sources. In operation, the numerical value provided to first input 110 may be multiplied by the numerical value provided to first weight 111 at multiplier 116. A first bias value 112 may be added to the output of first multiplier 116 at a first adder 115 to create first intermediate output 113. First bias value 112 may be a real number value, including a value of zero. The numerical value provided to second input 120 may be multiplied by the numerical value provided to second weight 121 at second multiplier 126. A second bias value 122 may be added to the output of second multiplier 126 at a second adder 125 to create second intermediate output 123. Second bias value 122 may be a real number value, including a value of zero. The numerical value provided to third input 130 may be multiplied by the numerical value provided to third weight 131 at a third multiplier 136. A third bias value 132 may be added to the output of third multiplier 136 at a third adder 135 to create a third intermediate output 133. First intermediate output 113, second intermediate output 123, and third intermediate output 133 may input to output node 150. At output node 150, first intermediate output 113, second intermediate output 123 and third intermediate output 133 may be summed at an output adder 152 and an activation function 155 may be applied to the output of output adder 152 to generate output 170. The activation function may include but is not limited to a hyperbolic tangent (tanh) function, a sigmoid function, a linear function, a rectified linear unit (ReLU), or any other mathematical function capable to translate a set of data from a first range of values to a second range of values.

Figure 2:
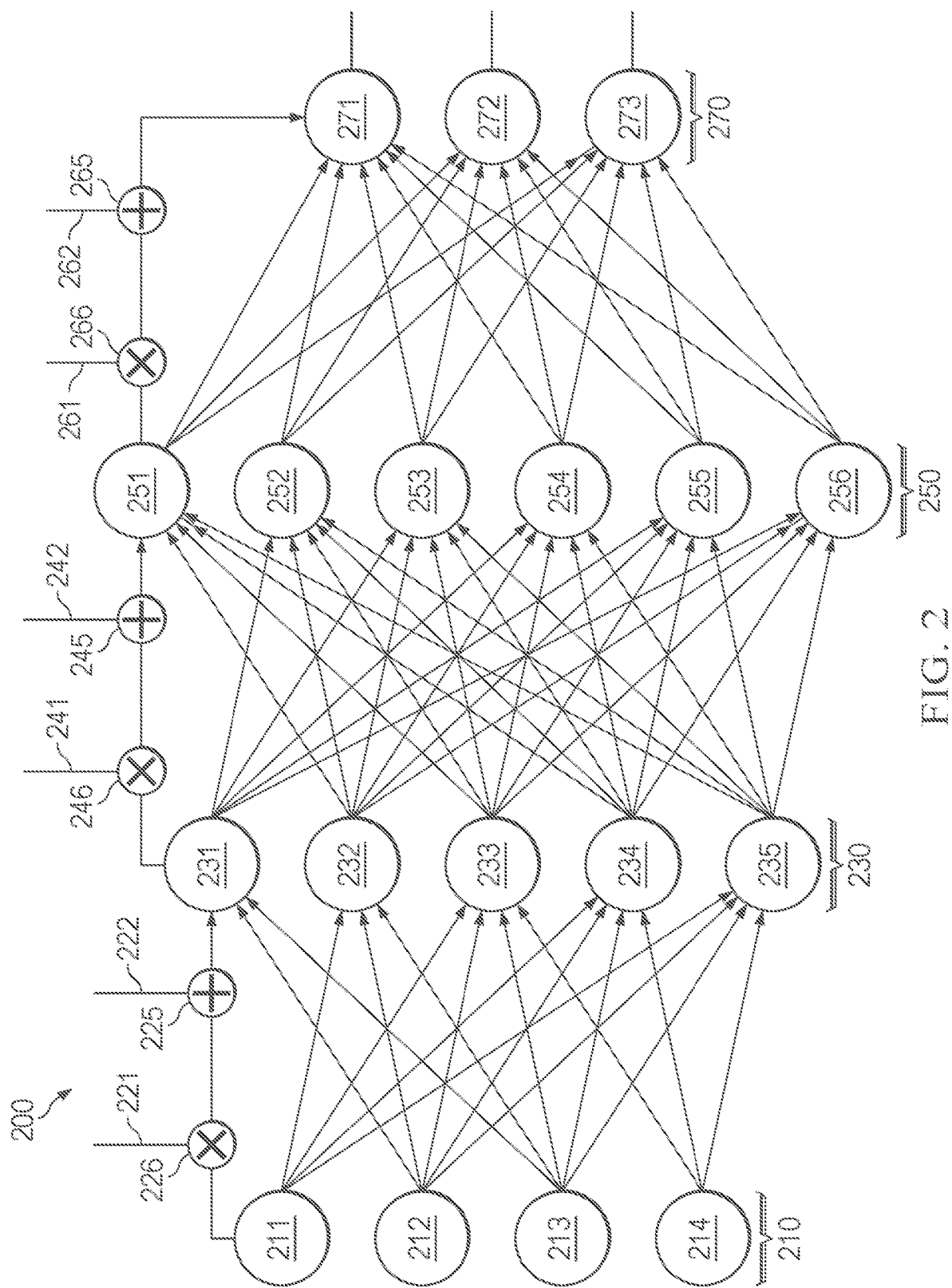
FIG. 2 illustrates one of various examples of a multi-layer neural network.

A plurality of perceptrons may form a multi-layer network. FIG. 2 shows one of various examples of a network diagram of a multi-layer network 200. Input layer 210 may include one or more inputs, indicated as nodes in the network diagram. The example of FIG. 2 is shown with 4 inputs, shown as input nodes 211, 212, 213, and 214. Other examples may include more inputs than the number shown in FIG. 2, or may include fewer inputs than the number shown in FIG. 2.

First input 211, second input 212, third input 213 and fourth input 214 may be storage locations which contain numerical values. Numerical values may be provided to first input 211, second input 212, third input 213 and fourth input 214, by a sensor, processor, controller, memory or other source capable to provide numerical values. Numerical values provided to first input 211, second input 212, third input 213 and fourth input 214 may be provided by, respectively, the same source or may be provided from different sources.

Each of input nodes 211, 212, 213 and 214 may be connected to at least one node of first hidden layer 230. In the example of FIG. 2, first hidden layer 230 may be comprised of nodes 231, 232, 233, 234 and 235. At each connection between a node of input layer 210 and a node of first hidden layer 230, the numerical value stored in the node of the input layer 210 may be multiplied by a weight value and a bias value may be added to the result of the multiplication in a manner as described in the single perceptron case of FIG. 1. As shown in FIG. 2, the numerical value provided to first input node 211 may be multiplied by a weight value 221 at a multiplier 226. A bias value 222 may be added to the output of multiplier 226 at an adder 225. Bias value 222 may be a positive value, a negative value, or may be zero-valued, where the bias value 222 may be set based on a predetermined algorithm. Node 231 of first hidden layer 230 may sum all inputs to node 231 and may apply an activation function to the result of the sum. The output of the activation function may be stored in node 231 of first hidden layer 230. Nodes 232, 233, 234 and 235 of first hidden layer 230, may similarly sum all inputs to the respective node and may apply an activation function to the result of the sum, and may store the output of the activation function in the respective node of first hidden layer 230.

In the example of FIG. 2, the multiplier and adder are only shown for a single path between input layer 210 and first hidden layer 230, but additional multipliers and adders may be present in all paths between respective nodes of input layer 210 and respective nodes of first hidden layer 230 of the network 200. Additional multipliers, adders and bias values on each path are not shown in order to improve the readability of the figure. A similar multiplication by a weight value and addition of a bias value may occur at every arrow connecting a respective node of the input layer 210 to a respective node of first hidden layer 230.

The example of FIG. 2 shows first hidden layer 230 with 5 nodes, but other examples may include a first hidden layer 230 with more nodes than the number shown in FIG. 2, or with fewer nodes than the number shown in FIG. 2. The example of FIG. 2 shows every node of input layer 210 connecting to every node of first hidden layer 230. Other examples may include a different combination of connections between nodes of input layer 210 and nodes of first hidden layer 230. The specific combination of connections between nodes of input layer 210 and nodes of first hidden layer 230 may be fixed in hardware, or may be programmable by a controller or by a software program. In one of various examples, a node of input layer 210 may connect to fewer than all of the nodes of first hidden layer 230, and a node of first hidden layer 230 may connect to fewer than all the nodes of input layer 210.

Each node 231, 232, 233, 234 and 235 of first hidden layer 230 may be connected to at least one node of second hidden layer 250. In the example of FIG. 2, second hidden layer 250 may be comprised of nodes 251, 252, 253, 254, 255, and 256. At each connection between a node of first hidden layer 230 and a node of second hidden layer 250, the value stored in the node of the first hidden layer 230 may be multiplied by a weight value, and a bias value may be added to the result of the multiplication. As shown in FIG. 2, the value stored in first hidden layer 230 at node 231 may be multiplied by a weight value 241 at multiplier 246. A bias value 242 may be added to the output of multiplier 246 at adder 242. The bias value may be a positive or negative value, chosen based on the specific algorithm. Each node may have a unique bias value. Some nodes may have the same bias values. Node 251 of second hidden layer 250 may sum all inputs to node 251 and may apply an activation function to the result of the sum. The result of the activation function may be stored in node 251 of second hidden layer 250. Nodes 252, 253, 254, 255 and 256 of second hidden layer 250 may similarly sum all inputs to the respective node and may apply an activation function to the result of the sum, and may store the output of the activation function in the respective node of second hidden layer 250.

In the example of FIG. 2, the multiplier and adder are only shown for a single path between first hidden layer 230 and second hidden layer 250, but additional multipliers and adders may be present in all paths between first hidden layer 230 and second hidden layer 250. Additional multipliers, adders and bias values on each path are not shown in order to improve the readability of the figure.

The example of FIG. 2 shows second hidden layer 250 with 6 nodes, but other examples may include a second hidden layer 250 with more nodes than the number shown in FIG. 2, or with fewer nodes than the number shown in FIG. 2. The example of FIG. 2 shows every node of first hidden layer 230 connecting to every node of second hidden layer 250. Other examples may include a different combination of connections between first hidden layer 230 and second hidden layer 250. The specific combination of connections between first hidden layer 230 and second hidden layer 250 may be fixed in hardware, or may be programmable by a controller or a software program. In one of various examples, a node of first hidden layer 230 may connect to fewer than all of the nodes of second hidden layer 250, and a node of second hidden layer 250 may connect to fewer than all the nodes of first hidden layer 230.

Each node 251, 252, 253, 254 and 255, 256 of second hidden layer 250 may be connected to at least one node of output layer 270. In the example of FIG. 2, output layer 270 may be comprised of nodes 271, 272 and 273. At each connection between a node of second hidden layer 250 and a node of output layer 270, the value stored in the node of the second hidden layer 250 may be multiplied by a respective weight value, and a respective bias value may be added to the result of the multiplication. As shown in FIG. 2, the value stored in second hidden layer 250 at node 251 may be multiplied by a weight value 261 at a multiplier 266. A bias value 262 may be added to the output of multiplier 266 at adder 265. The bias value may be a positive or negative value, chosen based on the specific algorithm. Each node may have a unique bias value. Some nodes may have the same bias values. Node 271 of output layer 270 may sum all inputs to node 271, and may apply an activation function to the result of the sum. The result of the activation function may be stored in node 271 of output layer 270. Nodes 272 and 273 of output layer 270 may similarly sum all inputs to the respective node and may apply an activation function to the result of the sum, and may store the output of the activation function in the respective node of output layer 270.

In the example of FIG. 2, the multiplier and adder are only shown for a single path between second hidden layer 250 and output layer 270, but these multipliers and adders may be present in all paths between second hidden layer 250 and output layer 270. Additional multipliers, adders and bias values on each path are not shown in order to improve the readability of the figure.

The example of FIG. 2 shows output layer 270 with 3 nodes, but other examples may include an output layer 270 with more nodes than the number shown in FIG. 2, or with fewer nodes than the number shown in FIG. 2. In one of various examples, output layer 270 may contain a single output node. The example of FIG. 2 shows every node of second hidden layer 250 connected to every node of output layer 270. Other examples may include a different combination of connections between second hidden layer 250 and output layer 270. The specific combination of connections between second hidden layer 250 and output layer 270 may be fixed in hardware, or may be programmable by a controller or by a software program. In one of various examples, a node of second hidden layer 250 may connect to fewer than all of the nodes of output layer 270, and a node of second hidden layer 250 may connect to fewer than all the nodes of output layer 270.

Figure 3:
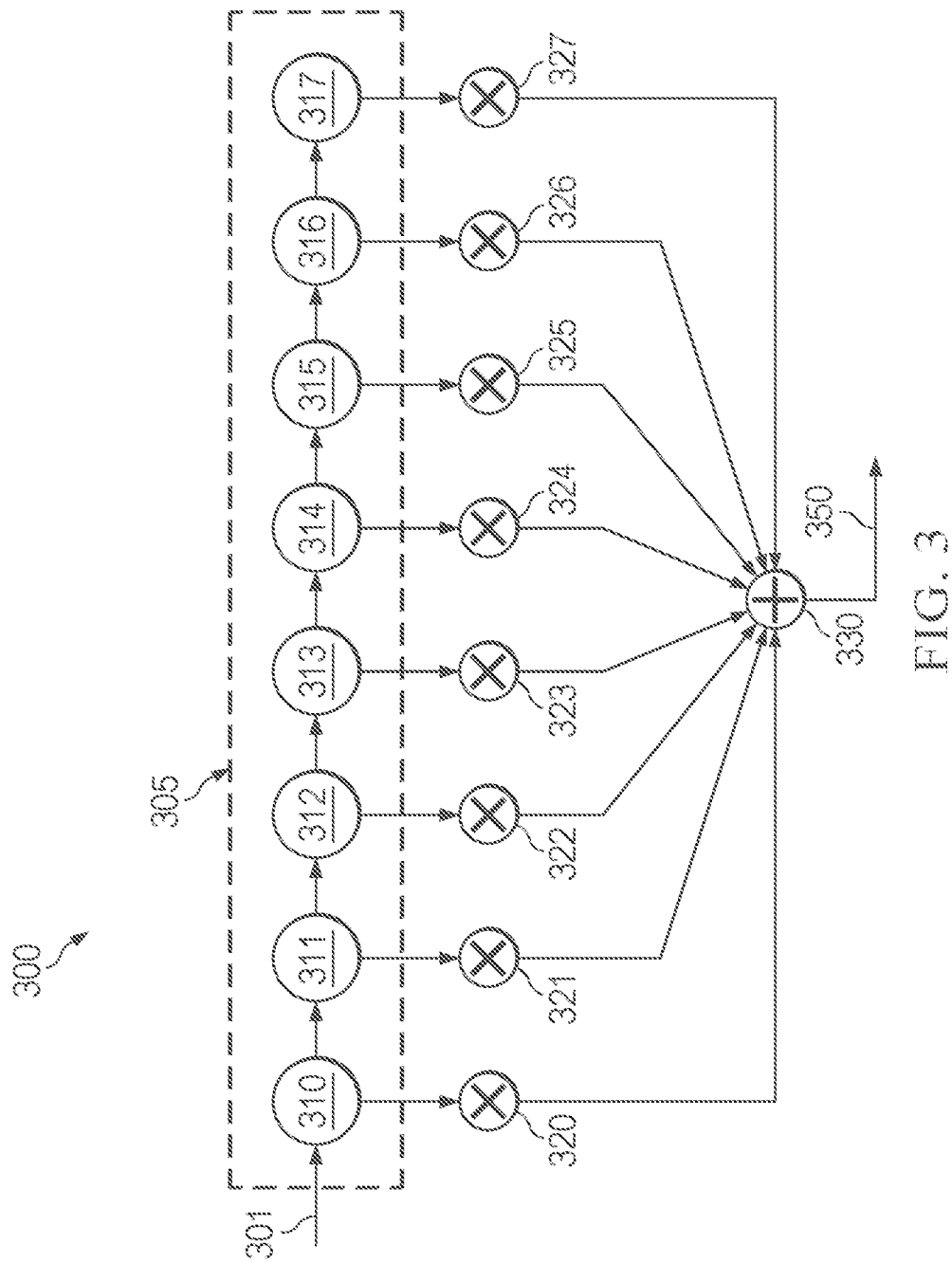
FIG. 3 illustrates one of various examples of a digital filter.

The examples of FIG. 1 and FIG. 2 may be used to implement a neural network for machine learning, image classification and many other applications. In one of various examples, other applications beyond neural networks may be structured as combinations of input nodes, multiplication by a weight, addition of a bias value and a summation as illustrated in FIG. 1 and FIG. 2. FIG. 3 shows one of various examples of a digital filter 300. The signal flow diagram of digital filter 300 may be defined as a network graph similar to FIG. 1 and FIG. 2. An input signal 301 may be input to an input node 310. Input nodes 311, 312, 313, 314, 315, 316, and 317, may be connected in a shift register configuration, with node 311 receiving input from an output of input node 310, input node 312 receiving input from an output of input node 311 and continuing to the end of the shift register, i.e. to node 317. Input nodes 311, 312, 313, 314, 315, 316 and 317 may be flip-flop storage, random-access memory (RAM) storage or other volatile or non-volatile memory components capable to store values of input signal 301. Samples of input signal 301 may shift in sequence and may be stored in nodes 311, 312, 313, 314, 315, 316, and 317. Input signal 301 may be an audio signal, a video or image signal, or any other sampled data signal. Outputs of input nodes 310, 311, 312, 313, 314, 315, 316, and 317, respectively, may be input to multipliers 320, 321, 322, 323, 324, 325, 326, and 327. Each of multipliers 320, 321, 322, 323, 324, 325, 326, and 327 may multiply their respective inputs by a weight value. Outputs of multipliers 320, 321, 322, 323, 324, 325, 326, and 327 may be input to an adder 330, as shown in FIG. 3. The output of adder 330 may generate output 350. In this manner, an FIR filter may be implemented as a matrix multiplication operation. In this example, the bias values may all be set to zero. The bias values and associated adders are not shown in FIG. 3 for simplicity.

In operation, matrix multiplication may be implemented in software, or may be implemented by dedicated hardware. In a software implementation, higher-level system functions may take priority over matrix multiplication operations, which may result in errors in a real-time system.

Figure 4:
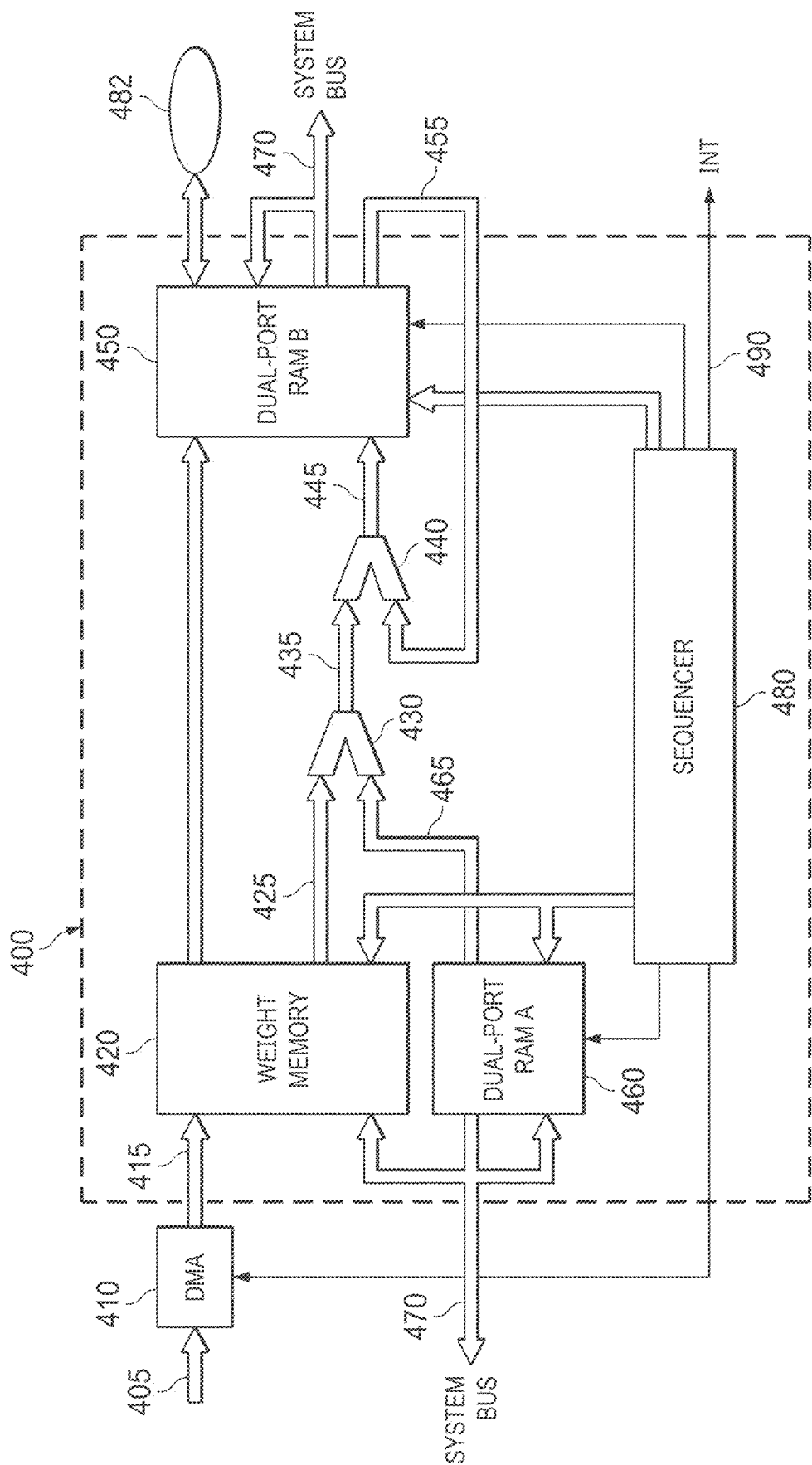
FIG. 4 illustrates a one of various examples of a peripheral matrix multiplication unit.

FIG. 4 illustrates one of various examples of a peripheral 400. Peripheral 400 illustrates one of various examples of an implementation of a matrix multiplication unit. Peripheral 400 may be part of a microcontroller which may implement the network graphs and signal flow diagrams of FIG. 1 and FIG. 2 and FIG. 3. The microcontroller may include other elements not illustrated in FIG. 4, including but not limited to a CPU, an oscillator, input and output ports and bus interfaces.

An external Direct Memory Access (DMA) circuit 410 may load weight values and bias values into peripheral 400 for a matrix multiplication operation. External DMA circuit 410 may load weight values into weight memory 420 from a DMA input 405 through a DMA output 415 of external DMA circuit 410. DMA input 405 may be provided by an analog-to-digital converter (ADC) or other peripheral device capable to provide a data input to external DMA circuit 410. System bus 470 may load weight values directly to weight memory 420. System bus 470 may load input values into RAM A 460. RAM A 460 may also be referred to as the input memory. Multiplier 430 may multiply values from, respectively, weight memory 420, via weight memory output 425, and RAM A 460, via RAM A output 465. RAM A output 465 may also be termed the input memory output. Multiplier 430 may generate multiplier output 435. Accumulator 440 may add a predetermined number of outputs from multiplier output 435 to respective values from RAM B output 455 and accumulate the result for the predetermined number of outputs from multiplier output 435. Accumulator output 445 may be input to RAM B 450. RAM B 450 may also be referred to as the output memory. RAM B output 455 may also be referred to as the output memory output.

In operation, a sequencer 480 may control operation of the peripheral 400 and movement of data between the various blocks in peripheral 400. As one of various examples, sequencer 480 may instruct external DMA circuit 410 to load a plurality of weight and bias values into weight memory 420 for one layer of a multi-layer network. External DMA circuit 410 may load all weights and biases for the entire layer in one operation, or may load the weights and biases in multiple steps while peripheral 400 is in operation. As one of various examples, while peripheral 400 is accessing data from RAM B 450 via system bus 470, the external DMA circuit 410 may be loading weight values into weight memory 420. Sequencer 480 may additionally load input values into RAM A 460 from system bus 470. Output signals from sequencer 480 may issue memory transactions to RAM A 460 to load input values into RAM A 460 from system bus 470. Multiplier 430 may multiply successive weights from weight memory 420 and successive input values from RAM A 460 provided via RAM A output 465 to generate intermediate outputs at multiplier output 435 as described previously in reference to FIG. 1. Accumulator 440 may add successive intermediate outputs at multiplier output 435 to generate an output for one node of the layer of the network at accumulator output 445. The output of one node of the network may be written to RAM B 450. In one of various examples, once the multiply and accumulate operations are complete, an activation circuit 482 may fetch the value of the output node from RAM B 450 and apply an activation function and re-write the result to RAM B 450. The activation circuit may require no interaction from a CPU, processor or controller. The activation circuit 482 may implement an activation function to include but not limited to a tanh function, a sigmoid function, a linear function, a rectified linear unit (ReLU), or may implement any other mathematical function capable to translate a set of data from a first range to a second range. In one of various examples, once the multiply and accumulate operations are complete for a given node, an interrupt 490 may be asserted by sequencer 480. The interrupt 490 may be programmed to trigger based on one of various conditions, including but not limited to the completion of the computations for one layer of the network. An interrupt service routine in peripheral 400 may issue instructions to fetch the output node value from RAM B 450, apply an activation function, and write the result of the activation function back into RAM B 450. In this manner, the interrupt enables peripheral 400 to use different activation functions for different nodes in the network. A similar sequence of operations may be continued for each node of a particular layer of the network. Once the entire layer of computation is complete, sequencer 480 may load weights and biases for the next layer into weight memory 420. Sequencer 480 may move the data for all the output nodes from RAM B 450 into RAM A 460 through system bus 470. Output signals from sequencer 480 may issue memory transactions to RAM A 460 and RAM B 450 to move data from RAM B 450 into RAM A 460 through system bus 470. Data may be transferred from RAM A 460 to RAM B 450 after a predetermined number of operations are complete. As was illustrated and disclosed regarding FIG. 2, the output nodes of one layer may be the input nodes of the next layer. By moving data from the output storage location (RAM B 450) to the input storage location (RAM A 460) through system bus 470, the same hardware can be used for successive layers, saving memory. When the final layer calculation is complete, interrupt 490 may be asserted to signal to an external system the completion of the calculation.

The invention claimed is:

1. A peripheral of a microcontroller of a multi-layered network comprising:
   a weight memory to receive data input comprising a plurality of weight values for one layer of the multi-layered network from, respectively, an external Direct Memory Access (DMA) circuit and a microcontroller system bus and to receive control input comprising memory transaction instructions from the sequencer, the weight memory to provide a weight memory output;
   an input memory to receive data input comprising a plurality of bias values for the one layer of a multi-layered network from the microcontroller system bus and control input comprising memory transaction instructions from the sequencer, the input memory to provide an input memory output;
   a multiplier to receive input from, respectively, the weight memory output and the input memory output, the multiplier to generate a multiplier output;
   an accumulator to receive input from, respectively, the multiplier output and an output memory output, the accumulator to generate an accumulator output;
   an output memory to receive data input from the weight memory output, the accumulator output, and the microcontroller system bus, and to receive control input from the sequencer, the output memory to provide output to, respectively, the microcontroller system bus and an output memory output;
   an activation circuit coupled to the microcontroller system bus, the activation circuit to implement an activation function that is a tanh function, a sigmoid function, a linear function, a rectified linear unit (ReLU) function, or a mathematical function to translate a set of data from a first range to a second range, the activation function comprising a function generating an output between zero and one, inclusive, wherein the activation function is to apply to the output memory output to generate a peripheral output from the peripheral to the microcontroller of the multi-layered network, and
   wherein the sequencer generates output signals coupled to the input memory and the output memory, the output signals to transmit memory transactions to the input memory and to the output memory, the memory transactions to control transfer of data between the input memory and the output memory at a predetermined time, and generates an interrupt signal to the microcontroller based on a programmable condition.

2. The peripheral as claimed in claim 1, the input memory comprising a dual-port random access memory.

3. The peripheral as claimed in claim 1, the output memory comprising a dual-port random access memory.

4. The peripheral as claimed in claim 1, the weight memory contents comprising weight values in a matrix multiplication operation.

5. The peripheral as claimed in claim 1, comprising an activation circuit coupled to the microcontroller system bus, the activation circuit to compute an activation function at a predetermined time, based at least in part on a value stored in the output memory.

6. The peripheral as claimed in claim 1, wherein the input memory comprises dual-port RAM.

7. The peripheral as claimed in claim 1, wherein the output memory comprises dual-port RAM.

8. A microcontroller comprising:
a peripheral of the microcontroller comprising:
- a weight memory to receive data input comprising a plurality of weight values for one layer of a multi-layered network from, respectively, an external Direct Memory Access (DMA) circuit and a microcontroller system bus and to receive control input comprising memory transaction instructions from the sequencer, the weight memory to provide a weight memory output;
- an input memory to receive data input comprising a plurality of bias values for the one layer of a multi-layered network from the microcontroller system bus and control input comprising memory transaction instructions from the sequencer, the input memory to provide an input memory output;
- a multiplier to receive input from, respectively, the weight memory output and the input memory output, the multiplier to generate a multiplier output;
- an accumulator to receive input from, respectively, the multiplier output and an output memory output, the accumulator to generate an accumulator output;
- an output memory to receive data input from the weight memory output, the accumulator output, and the microcontroller system bus, and to receive control input from the sequencer, the output memory to provide output to, respectively, the microcontroller system bus and an output memory output;
- wherein the sequencer generates output signals coupled to the input memory and the output memory, the output signals to transmit memory transactions to the output memory and the input memory, the memory transactions to control transfer of data words from the output memory to the input memory at a predetermined time, and generates an interrupt signal to the microcontroller based on a programmable condition, and
- an activation circuit to compute an activation function at a predetermined time, based at least in part on a value stored in the output memory, the activation circuit to implement an activation function that is a tanh function, a sigmoid function, a linear function, a rectified linear unit (ReLU) function, or a mathematical function to translate a set of data from a first range to a second range, the activation function comprising a function generating an output between zero and one, inclusive, wherein the activation function is to apply to the output memory output to generate a peripheral output from the peripheral to the multi-layered network.

9. The microcontroller as claimed in claim 8, the weight memory contents comprising weight values in a matrix multiplication.

10. The microcontroller as claimed in claim 8, the accumulator to accumulate values in a matrix multiplication operation.

11. The microcontroller as claimed in claim 8, wherein the input memory comprises dual-port RAM.

12. The microcontroller as claimed in claim 8, wherein the output memory comprises dual-port RAM.

13. A method comprising:
- loading weight values comprising a plurality of weight values for one layer of the multi-layered network into a weight memory of a peripheral of a microcontroller of the multi-layered network;
- loading input values comprising a plurality of bias values for the one layer of the multi-layered network into an input memory of the peripheral of the microcontroller of the multi-layered network;
- multiplying, respectively, a value stored in the weight memory and a value stored in the input memory to generate a multiplier output;
- accumulating a plurality of successive multiplier outputs in an accumulator of the peripheral of the microcontroller of the multi-layered network;
- storing the result of the accumulator in an output memory of the peripheral of the microcontroller of the multi-layered network;
- triggering an interrupt signal to the microcontroller in response to storing the result; and,
- transferring a plurality of results of the accumulator from the output memory to the input memory after a predetermined number of accumulator results have been stored in the output memory; and
- applying an activation function based at least in part on the accumulator result stored in the output memory, wherein the activation function is a tanh function, a sigmoid function, a linear function, a rectified linear unit (ReLU) function, or a mathematical function to translate a set of data from a first range to a second range, the activation function comprising a function generating an output between zero and one, inclusive, to generate a peripheral output from the peripheral to the microcontroller of the multi-layered network.

14. The method as claimed in claim 13, the method comprising applying the activation function based at least upon the triggering of the interrupt signal to the microcontroller.

15. The method as claimed in claim 13, wherein transferring the plurality of results comprises transmitting memory transactions to, respectively, the output memory and the input memory, the memory transactions to control transfer of data words from the output memory to the input memory at a predetermined time.

16. The method as claimed in claim 13, wherein the input memory comprises dual-port RAM.

17. The method as claimed in claim 13, wherein the output memory comprises dual-port RAM.

* * * * *